United States Patent [19]

Grobbel et al.

[11] Patent Number: 5,006,279

[45] Date of Patent: Apr. 9, 1991

[54] WATER-BASED COATING REMOVERS

[76] Inventors: William J. Grobbel, 70717 Romeo Plank, Romeo, Mich. 48065; Bruce R. Berry, 670 Hawksmoore, Clarkston, Mich. 48016

[21] Appl. No.: 235,591

[22] Filed: Aug. 24, 1988

[51] Int. Cl.$^5$ .................... C11D 1/18; C11D 3/44
[52] U.S. Cl. ........................... 252/542; 252/153; 252/166; 252/168; 252/170; 252/171; 252/542; 252/DIG. 8; 134/38
[58] Field of Search ............... 252/542, 166, 162, 167, 252/DIG. 8, 153, 548, 166, 168, 170, 171; 134/38

[56] References Cited

U.S. PATENT DOCUMENTS

| | | | |
|---|---|---|---|
| 4,120,810 | 10/1978 | Palmer | 252/153 |
| 4,749,510 | 6/1988 | Nelson | 252/166 |
| 4,764,222 | 8/1988 | Colegrove | 134/38 |
| 4,865,758 | 9/1989 | Caster et al. | 252/171 |

OTHER PUBLICATIONS

GAF Chemicals Corporation Technical Data Sheet IM-288 2302-184-007.
GAF Chemicals Corporation Technical Data Sheet IM-288 2302-184-006.
GAF Chemicals Corporation Technical Data Sheet IM-288 2302-184-008.
GAF Chemicals Corporation Technical Data Sheet IM-288 2302-184-001.
GAF Chemicals Corporation Technical Data Sheet IM-288 2302-184-003.
GAF Chemicals Corporation Technical Data Sheet IM-288 2302-184-004.

*Primary Examiner*—Josephine Barr
*Attorney, Agent, or Firm*—Bruce E. Harang

[57] ABSTRACT

This invention relates to water-based coating remover compositions and concentrates from which those compositions are made and processes for preparing said compositions and concentrates where said concentrates comprise a substantially stable and homogenous mixture of N-methyl-2-pyrrolidone, a mononuclear aromatic hydrocarbon, a glycol ether, an alkanolamine and a hydroxypropyl cellulose thickener.

18 Claims, No Drawings

WATER-BASED COATING REMOVERS

BACKGROUND OF THE INVENTION

1. Field of the Invention

The present invention relates to water-based coating remover compositions, and concentrates from which said compositions are made. The present invention also relates to a process for preparing said concentrates and water-based compositions.

2. Description of Relevant Art

The removal or stripping of paint, varnish, lacquer and other coatings or finishes from a surface is generally very complex presenting a variety of problems to those in the art. Factors which influence a particular stripping operation include: the type of coating(s); thickness of the coating(s); type of substrate the coating is on; whether a primer was used and if so the type and thickness of primer; the type of pigment; the curing time, temperature and method; and the age of the coating.

As paint and other coating formulations improve, it becomes increasingly difficult to remove these coatings from a variety of surfaces and in a variety of situations. Such situations range from large industrial operations to a hobbyist refinishing a piece of furniture. The coatings to be removed range from old oil-based paints to highly polymerized modern coating materials which, by design, are increasingly resistant to chemical removers. Desirable properties and characteristics for a coatings remover includes: stripping ability (effectiveness); be non-corrosive to the substrate; will not promote galvanic attack at the juncture of different metals; free of noxious and toxic chemicals; good shelf life; low volatility; leave a substrate ready for further processing; and be low in cost.

The known coating removers, many of which typically include methylene chloride, suffer from numerous disadvantages such as toxicity, flammability, volatility, non- or inadequate biodegradability and/or difficult to apply and/or remove.

A non-methyl chloride containing paint stripper is disclosed in U.S. Pat. No. 4,666,626 which generally discloses a non-methylene chloride paint stripper composition containing oxo-hexyl acetate as the chief cleaning agent in combination with cyclohexanone. The compositions preferably also contain furfuryl alcohol, an aromatic naphtha solvent, methyl cellulose thickener dodecyl benzene sulfonate, N-methyl-2-pyrrolidone, diisobutyl ketone and sodium xylene sulfonate. It is also stated the composition readily emulsifies with water and is removable by water.

Although N-methyl-2-pyrrolidone is known for use primarily as an activator or cosolvent in certain paint, varnish and other coatings removers, it is also known for use as an active solvent in some coating remover formulations.

In U.S. Pat. No. 4,120,810, a paint remover composition consisting of a mixture of 15-60 mole percent NMP and 35 or more mole percent of an aromatic hydrocarbon solvent consisting of a mixture of aromatic hydrocarbons having more than 6 carbon atoms is disclosed. Also disclosed as optional ingredients are high flash point glycol ethers (up to 50 mole percent), from one to six percent of a cellulose thickener, and a surfactant to improve water washability. Although effective as a paint remover, stripping formulations based on this reference present certain disadvantages. Commercially available formulations did not rinse well with water leaving behind a white haze on the substrate believed to be precipitated thickener. The cost of these formulations is high particularly when compared to methylene chloride based removers. There is a high volatile organic material content to these formulations which causes environmental concerns particularly regarding disposal of spent remover. The disclosure states that water should not be used as a constituent of those formulations.

In U.S. Pat. No. 2,918,443, a solvent for use in applying resins consisting of copolymers of vinyl chloride and vinyl acetate in certain proportions is described, said solvent consisting of 7 to 95 percent by weight N-aliphatic hydrocarbon substituted derivatives of 2-pyrrolidone having no more than four carbon atoms in the aliphatic carbon group and a liquid mono nuclear aromatic hydrocarbon. There is no disclosure or suggestion of several of the constituents of the present concentrate or water-based formulation o that such constituents could be used to afford a stable water-based coating remover composition.

In U.S. Pat. No. 4,085,059, a liquid coating remover, particularly for polyamide epoxy resin type coatings, adapted for forming a relatively stable foam is disclosed. This coating remover consists of 5–35 percent by weight N-methyl-2-pryrrolidone (NMP), 10–35 percent by weight water-soluble organic surfactant blend capable of emulsifying a gas, and 30–85 percent by weight water. The surfactant blend is said to consist of a mixture of 5–15 percent by weight $C_6$–$C_{18}$ fatty acid material, 3–10 percent by weight alkylolamines and 5–15 percent by weight polyhydric alcohols, all amounts based on the total weight of the composition. Applicant's invention includes constituents which are not disclosed or suggested by this reference. Unlike the present invention, the reference uses a blend of at least three surfactants and is adapted to form an emulsion with a gas; that is a foam.

In *M-pyrol Handbook*, GAF Corporation, 1972, pages 51–52, discloses two paint remover formulations that include N-methyl-2-pyrrolidone. The first formulation includes NMP at 56.5 parts by weight and methylene chloride at 30 parts by weight along with a particular anionic surfactant at 10 parts by weight, paraffin wax at 1.5 parts by weight and Methocel ® HG (hydroxypropyl methylcellulose thickener commercially available from the Dow Chemical Company) at 2.0 parts by weight. The present invention does not include methylene chloride or paraffin wax and does include other constituents.

The second formulation consists of NMP at 98.5 parts by weight, di-2-ethylhexylamine at 0.75 parts by weight and Carbopol ® 934 resin (commercially available from B. F. Goodrich Chemical Co.). The high cost of such a formulation because of the large NMP concentration renders such a formulation quite unattractive.

A brochure available from The Dow Chemical Company entitled METHOCELL 311 Cellulose Ether (form no. 192-1040-87) describes viscosification properties of METHOCELL 311 (commercially available from The Dow Chemical Company) in various methylene chloride/alcohol systems. It also describes viscosification properties of METHOCELL 311 in four non-methylene chloride paint stripper formulations. All formulations include toluene at 23.5 percent by weight, methyl alcohol at 19.0 percent by weight and METHOCELL 311 at 1.0 percent by weight. Test formulation 1 includes NMP at 55 percent by weight. Test formulation 2 includes acetophenone at 55 percent by weight. Test formulation 3 includes tripropylene glycol monomethyl ether at 55 percent by weight. Test formulation 4 includes a mixture of tripropylene glycol monomethyl ether and acetophenone, each at 27.5 percent by weight. All of these formulations require the presence of methyl alcohol which is undesirable due to its toxic effects on humans.

Despite the above and other alternatives to methylene chloride type removers, there continues to be a need for coating removers having equivalent or improved performance to the known removers at lower cost.

Accordingly, one object of the present invention is to provide a coating remover composition, particularly for coatings of the type used on motor vehicles such as acrylic lacquer, acrylic enamel, clear and primer paints and acrylic and alkyd-based architectural primers and enamels that is of reduced toxicity.

Another object is to provide a coating remover that is composed of high flash point constituents and exhibits low skin irritation.

A further object is to provide a coating remover having reduced volatile organic material content while being effective and has a good shelf life.

Still a further objective is to provide a coating remover that is compatible with motor vehicle production spray booth materials such as nylon hoses and stainless steel booth components, and glass while also being compatible with plant paint/sludge waste water systems, and is particularly effective for cleaning the walls, floors and spray equipment of automobile assembly plant paint booths.

SUMMARY OF THE INVENTION

It has unexpectedly been found that an effective, substantially stable, coating remover, can be prepared having water as a major constituent. The coating remover of the present invention is prepared from a concentrate adapted to afford an effective, safe, substantially stable homogenous waterbased composition when admixed with water (A) From about 16 to about 28 percent by weight of N-methyl-2-pyrrolidone; and
(B) From about 27 to about 68 percent by weight of at least one mononuclear aromatic hydrocarbon; and
(C) From about 14 to about 30 percent by weight of a glycol ether; and
(D) From about 0.5 to about 4 percent by weight of an alkanolamine; and
(E) From about 0.66 to about 0.88 percent by weight of a hydroxypropyl cellulose thickener, where the percentages are based on the total weight of the concentrate.

The present invention also includes the concentrate as defined above in admixture with from about 30 to about 55 percent by weight water, based on the total weight of the concentrate.

Further, the present invention includes a process for making the concentrate and the water-based remover composition.

DETAILED DESCRIPTION OF THE INVENTION

In accordance with one aspect of the present invention, an effective, safe, substantially stable, homogenous, water-based coating remover composition can be obtained by blending water with a coating remover concentrate comprised of a homogenous thickened mixture of three different active solvents and an alkanolamine.

The water-based coating remover of the present invention is useful for removing various cured and uncured paints, varnishes, lacquers and other coatings or finishes, particularly coatings used on motor vehicles such as acrylic type lacquer and enamel, polyurethane based clear protective coatings and base or primer coatings. The coating removers of the present invention are also effective in removing acrylic and alkyd based architectural primers and enamels and polyurethane protective coatings.

The water-based coating remover of the present invention can be used for removing paint, lacquers, varnishes and other coatings or finishes from a variety of substrates including paint brushes without significant damage, such as etching, pitting or corrosion to such substrate. Examples of substrates on which the coating remover of the present invention can be used includes: wood; glass; acrylic type plastics; concrete; and various metals such as aluminum, galvanized steel, stainless steel and automotive grade and quality steels. The coating remover of the present invention is particularly effective for cleaning the walls, floors and spray equipment of automobile assembly plant paint booths.

Because the coating remover of the present invention is a water-based formulation, it is readily removed from a substrate by a stream of water even after stripping a coating from said substrate. The water-based remover compositions of the present invention are applied by conventional means such as brushing, spraying, or, where practical, can be used as an immersion bath.

Generally, the coating remover concentrate of the present invention, adapted to afford a substantially stable water-based composition when admixed with water, comprises a substantially homogenous mixture of from about 16 to about 28 percent by weight of N-methyl-2-pyrrolidone (NMP), from about 27 to about 68 percent by weight of at least one mononuclear aromatic hydrocarbon, from about 14 to about 30 percent by weight of a glycol ether, from about 0.5 to about 4.0 percent by weight of an alkanolamine, and from about 0.66 to about 0.88 percent by weight of a hydroxypropyl cellulose thickener. The above percentages by weight are based on the total weight of the concentrate.

As stated above, generally from about 14 to about 28 percent by weight of NMP is used in the concentrate of the present invention, preferably from about 20 to about 26. Although it is possible to include more than 28 percent by weight of NMP, the cost of such compositions for the applications disclosed herein also increases without a commensurate increase in coating removal effectiveness.

The mononuclear aromatic hydrocarbon constituent is generally used at from about 27 to about 68 percent by weight in the concentrate, preferably from about 40 to about 60, and most preferably from about 45 to about 55. Suitable mononuclear aromatic hydrocarbon solvents are benzene, $C_1$–$C_4$ alkyl mono, di or tri-substituted benzenes or mixtures thereof. Examples of these aromatic hydrocarbons includes toluene, xylene (all of the isomers), hemimellitene, pseudocumene, mesitylene, ethylbenzene, n-propylbenzene, cumene, n-butylbenzene, isobutylbenzene, sec-butylbenzene, tert-butylbenzene, para-cymene and the like. Preferably, the $C_8$–$C_{10}$ alkyl-substituted benzenes are used. These aromatic hydrocarbons are commercially available or can be prepared by known methods. Particularly preferred, because of its cost and effectiveness, is a blend of $C_8-C_{10}$, alkyl-substituted mononuclear aromatic hydrocarbons referred to as "light aromatic solvent naphtha" and sold by Exxon Company under the product name Aromatic 100 and Ashland Oil Company under the product name Hysol 10. Substantially equivalent mixtures are commercially available from other sources. Such mixtures have a specific gravity of from about 0.862 to about 0.892 and a boiling point range of from about 152° C. to about 168° C. Also suitable are Aromatic 150 and Hysol 15. It is believed that other aromatic hydrocarbons could be used in place of the mononuclear aromatic hydrocarbons, such as heavy aromatic naphtha which is a blend of alkylbenzenes and alkyl naphthalenes.

The glycol ether constituent of the present invention is a tripropylene glycol monoalkyl ether where the alkyl group has 1 to 4 carbon atoms or a diethylene glycol monobutyl ether. Preferably, the glycol ether is tripropylene glycol monomethyl ether. The amount of glycol ether used in the concentrate, generally, is from about 14 to about 30 percent by weight, preferably from about 22 to about 28 percent by weight. These materials are commercially available or can be prepared by procedures known to those skilled in the art.

The alkanolamine constituent of the present invention is a $C_2-C_4$ mono-, di- or trialkanol amine, for example mono-, di- or triethanolamine, propanolamine, including normal propanolamines and triisopropanolamine or mixtures of such alkanolamines. Preferably, the alkanolamine is a mono-, di- or triethanolamine and particularly preferred is monoethanolamine. The alkanolamine is present in the concentrate, generally from about 0.5 to about 4.0 percent by weight and preferably from about 1 to about 3 percent by weight. The alkanolamine is used as an alkalizing agent to bring the pH of the water-based coating remover composition to from about 9 to about 12, preferably from about 10 to about 11.

Both the type and amount of hydroxypropyl cellulose thickener are important to afford an effective, substantially stable water-based composition. "Substantially stable" should be understood as meaning the composition will remain substantially homogenous and not separate into visible or visually observable layers for at least 72 hours preferably about 96 hours upon standing undisturbed and, should layering occur, will readily return to a homogenous state with gentle shaking by hand. This stability is, of course, one measure of the shelf life of a coating remover. The cellulose thickener useful in the present invention is hydroxypropyl methylcellulose. Certain other thickening agents have been tried, but were unsatisfactory for one reason or another generally relating to effectiveness or stability and will be discussed in greater detail below. A particularly preferred hydroxypropyl methyl cellulose is commercially available from the The Dow Chemical Company under the name Methocel ® 311. The amount of cellulose thickener present in the concentrate of the present invention, generally, is from about 0.66 percent by weight to about 0.88 percent by weight, preferably from about 0.7 percent by weight to about 0.82 percent by weight, and most preferably from about 0.75 to about 0.8 percent by weight. When hydroxypropyl methylcellulose is present in the concentrate above or below these levels, significant loss of stability will occur in the water-based composition.

There are no special requirements for the water and tap, well, deionized, bottled, etc., may be used without significant impact on effectiveness or stability of the water-based formulation. Generally, based on the total weight of the concentrate, the water will be equal to from about 30 to about 55 percent by weight, preferably from about 40 to about 53 percent by weight and most preferably from about 45 to about 50 percent by weight. As the amount of water is decreased, the cost of the water-based formulation increases commensurately.

Although as little as 10 percent by weight of water affords an effective stripping composition, the composition tends to separate into visible layers within about 24 hours. Similarly, about 20 percent by weight of water also affords an effective stripping composition but separates into visible layers within about 48 hours. Handshaking of these formulations returns them to a substantially homogenous mixture with no apparent detrimental effect on stripping performance. The relative speed at which these formulations separate into visible layers is undersirable and the cost of such formulations is also increased.

A deterioration in the performance is observed when water constitutes 60 percent by weight or more of the water-based formulation. In order to obtain the maximum performance at the lowest cost, the water should constitute, as stated above, generally from about 30 percent by weight to about 55 percent by weight of the water-based formulation, preferably from about 40 to about 53 percent by weight and most preferably from about 45 to about 50 percent by weight.

Accordingly, based on the total weight of the water-based formulation, the percent by weight of the constituents are substantially a shown below in Table I.

TABLE 1

| Constituent | Constituent Amounts Water Content of Formulation (in percent by weight) | | | | |
| --- | --- | --- | --- | --- | --- |
| | 30 | 40 | 45 | 53 | 55 |
| NMP | 11.2–19.6 | 9.6–16.8 | 8.8–15.4 | 7.52–13.16 | 7.2–12.6 |
| Mono-Nuclear Aromatic | 18.9–47.6 | 16.2–40.8 | 14.85–37.4 | 12.69–31.96 | 12.15–30.6 |
| Glycol Ether | 9.8–21.0 | 8.4–18.0 | 7.7–16.5 | 6.58–14.1 | 6.3–13.5 |
| Alkanolamine | 0.35–2.8 | 0.3–2.4 | .0275–2.2 | 0.235–1.88 | 0.225–1.8 |
| Hydroxypropyl Cellulose Thickener | 0.462–0.616 | 0.396–0.528 | .0363–0.484 | 0.31–0.414 | 0.297–0.396 |

Optionally, and preferably, a nonionic surfactant is included in the concentrates and water-based formulations of the present invention. The nonionic surfactants useful in the practice of this invention are water soluble ethoxylated alkyl phenols having 1 to 20 alkyl carbon atoms in the alkyl group and a molecular weight of about 500 to about 5000. These ethoxylated alkyl phenols are derived from the reaction of ethylene oxide to produce a homopolymer. Alternatively, a block or heteric copolymer is prepared by reacting ethylene oxide and a lower alkylene oxide, preferably having 3 or 4 carbon atoms with an alkyl phenol. The alkyl phenol preferably has about 6 to about 18 carbon atoms in the alkyl group. Preferably, the ethoxylated alkyl phenols are derived from the reaction of said alkyl phenol with ethylene oxide or ethylene oxide and propylene oxide provided that the ethoxylated alkyl phenol contains at least 60 percent by weight, preferably about 70 percent to about 90 percent by weight of ethylene oxide residue. The homopolymer ethoxylated alkyl phenols contain the residue of about 5 to 100 moles of ethylene oxide. Representative alkyl phenols useful in preparing the ethoxylated alkyl phenols are octyl phenol, isoctylphenol, nonylphenol, dodecylphenol, dinonylphenol, and mixtures of alkylphenols.

The ethoxylated alkyl phenols are commercially available or can be prepared by techniques known to those skilled in the art.

To obtain a substantially stable and homogenous blend of constituents, when present, the ethoxylated alkyl phenol surfactant should be used at from about 1.6 to about 2.0 percent by weight based on the total weight of the concentrate. This corresponds to from about 0.72 to about 1.04 percent by weight based on the total weight of the water-based formulation, preferably, about 0.8 to about 1.0 percent by weight. When present above or below these amounts, the ethoxylated alkyl phenol surfactant has a detrimental impact on the stability, homogeneity and effectiveness of the concentrate and formulation.

The process for preparing the concentrate and the water-based formulation of the present invention is also important in obtaining a substantially stable and effective product.

Generally, the concentrate is prepared at ambient temperature by admixing the mononuclear aromatic hydrocarbon and the NMP and then adding the hydroxypropyl cellulose thickener. This mixture is then blended until the thickener is thoroughly dissolved. Mixing is continued as the remaining constituents are added. The glycol ether is added next, either neat or in admixture with the alkanolamine. If not admixed with the glycol ether, the alkanolamine is the last constituent blended into the concentrate. Although it is possible to add the thickener to a mixture of NMP, the mononuclear aromatic and glycol ether with blending, this is not recommended as the thickener dissolves more slowly.

When present, the ethoxylated alkyl phenol is preferably blended into the formulation, that is, after the addition of water. Alternatively, the ethoxylated alkyl phenol can be blended into the glycol ether during the preparation of the concentrate.

Alternatively, and preferably, the NMP is heated to from about 70° C. to about 120° C., preferably from about 90° C. to about 110° C., and the hydroxypropyl cellulose thickener is added to the heated NMP and blended conditions until the thickener is thoroughly dissolved. Heating is discontinued and the remaining constituents added sequentially with mixing substantially as described above.

To afford a substantially stable water-based formulation, the concentrate should have a viscosity of from about 320 to about 360 cps at 20° C. as measured on a Brookfield viscometer, number 3 spindle at 30 rpm.

Within about two hours after the concentrate has been prepared, the water must be added to afford an effective, substantially stable formulation. Failure to add water within the prescribed time results in a deterioration in stripping performance.

Although it is not entirely understood, the shear conditions under which blending, or mixing, of the constituents appears to influence the homogeneous nature and stability of the water-based formulations of the present invention. While it may be possible to prepare substantially stable, homogenous formulations using high-shear blending, it is highly preferred that low-shear blending conditions be used in preparing the concentrate and water-based formulations of the present invention. "Low-shear" blending should be understood as meaning adjusting the blending speed to ensure good particle and constituent mixing but not so high as to create a deep vortex cavity.

If not previously noted, the following factors are believed to be important in obtaining an effective, substantially stable water-based formulation: the time when and amount of hydroxypropyl cellulose thickener added; the order of constituent addition; the shear conditions under which blending is carried out; and the time when water is added to the concentrate.

The following examples will further illustrate the present invention but are not intended to limit it in any way. By substantially following the procedures described herein, the concentrate and water-based formulations of the present invention are obtained. Where stated "tap water" is from the City of Detroit, Mich., municipal water system.

The water-based coating remover compositions were evaluated for their stability and effectiveness. Stability is determined by allowing a formulation to remain undisturbed for two weeks (14 days) and visually observing whether a homogenous mixture remained or whether the formulation separated into separate and distinct layers.

The effectiveness of the water-based coating remover compositions are evaluated by placing ten drops at the top of a previously coated 12 inch square stainless steel board (panel) positioned at a 45 degree angle, and allowing the formulation to run down the panel. The panel is rinsed with about 30 drops of water and is then examined for any coating residue remaining. The coatings on the panel are dried, but not otherwise cured.

EXAMPLE 1

Step A:

A coating remover concentrate is prepared from the following constituents:

| Constituent | Amount (parts by weight) |
| --- | --- |
| Aromatic 100 | 46.56 |
| N-methyl-2-pyrollidone | 25.18 |
| Hydroxypropyl methylcellulose | 0.78 |
| Tripropylene glycol methylether | 26.44 |
| Monoethanol amine | 1.04 |

The thickener is dissolved in a mixture of NMP and aromatic and blended using a propeller type Lightening brand axial flow mixer under low shear conditions until no thickener particles are observable, about one hour at room temperature. The blending speed was adjusted to ensure good particle mixing with an observable depression but not so high as to create a deep vortex cavity. The glycol ether is then rapidly added with continued blending. The monoethanol amine was then added with continued blending until a substantially homogenous mixture was obtained. The viscosity of the concentrate was 320 cps at 20° C. on a Brookfield viscometer, number 3 spindle at 30 rpm.

Step B:

To the concentrate from Step A, an equal part of tap water was added, with low-shear blending as described in Step A, until a substantially homogenous mixture was afforded. A mild exotherm ensued. The product is a white, milky liquid having a pH of 10–11 with a density of 8.05 pounds per gallon.

EXAMPLE 2

A concentrate was prepared substantially in accordance with the procedures as described in Example 1, Step A. To this concentrate, 10 percent by weight, based on the weight of the concentrate, of tap water was added substantially according to the procedures described in Example 1, Step B.

EXAMPLE 3

A concentrate was prepared substantially according to the procedures described in Example 1, Step A. To this concentrate, 20 percent by weight, based on the weight of the concentrate, of tap water was added substantially according to the procedures described in Example 1, Step B.

EXAMPLE 4

A concentrate was prepared substantially in accordance with the procedures described in Example 1, Step A. To this concentrate, 30 percent by weight, based on the weight of the concentrate, of tap water was added substantially according to the procedures described in Example 1, Step B.

EXAMPLE 5

A concentrate was prepared substantially in accordance with the procedures described in Example 1, Step A. To this concentrate, 40 percent by weight, based on the weight of the concentrate, of tap water was added substantially according to the procedures described in Example 1, Step B.

EXAMPLE 6

A concentrate was prepared substantially according to the procedures described in Example 1, Step A. To this concentrate, 50 percent by weight, based on the weight of the concentrate, of well water from a well in Romeo, Mich. Caving a hardness value of 0.35 was added substantially according to the procedures described in Example 1, Step B.

EXAMPLE 7

A water-based formulation was prepared substantially according to the procedures described in Example 1, except that in Step B, bottled water from Absopure was used.

EXAMPLE 8

A water-based formulation was prepared substantially according to Example 1, except that in Step B, distilled water was used.

EXAMPLE 9

A water-based formulation was prepared substantially according to the procedures described in Example 1, except that triethanolamine was used rather than monoethanolamine.

EXAMPLE 10

A water-based formulation was prepared substantially according to the procedures described in Example 1, except that the monoethanolamine and tripropylene glycol monomethyl ether are pre-mixed before addition to the concentrate in Step A.

The water-based formulations of Examples 1 through 10 were evaluated for their stability and effectiveness in accordance with the procedures described above. Each of these formulations are found to be effective in removing red base coat automotive paint, acrylic lacquer automotive paint, and polyurethane topcoat automotive coating, and the panel rinsed clean with water. No observable coating residue could be detected on the panel for any of these examples.

Examples 1 and 5 through 10 are found to be stable for at least 14 days. Example 4 remained stable for about 4 days, but was readily re-homogenized with hand-shaking and evaluated again for stripping effectiveness substantially as described above. No decline in stripping effectiveness was observed. Examples 2 and 3 separated into layers at respectively, about 24 and about 36 hours. Both Examples re-homogenized with hand-shaking and when evaluated again for stripping effectiveness, substantially as described above, no decline in performance was observed.

EXAMPLE 11

A coating remover concentrate is prepared substantially in accordance with the procedures as described in Example 1, except that in Step A, the thickener is blended into NMP heated to about 100° C. After the thickener is thoroughly dissolved, heating is stopped and the mixture allowed to cool to about room temperature prior to blending in the remaining constituents.

EXAMPLE 12

A formulation was prepared substantially according to the procedures described in Example 1. The formulation was placed in the freezer section of a refrigerator and remained there until completely frozen. The formulation was then removed and allowed to warm to room temperature. This freeze-thaw cycle was repeated 5 times. The formulation remained substantially homogenous; that is, no separation into was layers was visually observable. This formulation was then evaluated for its paint-stripping effectiveness on red base coat automotive paint. No observable paint residue or formulation remained on the panel.

EXAMPLE 13

A concentrate was prepared substantially in accordance with the procedures described in Example, Step A. To this concentrate, 60 percent by weight, based on the weight of the concentrate of tap water was added substantially according to the procedures described in Example 1, Step B.

The formulation was then evaluated to determine its paint removing effectiveness on red base coat automotive paint in accordance with the procedures previously described. This formulation left observable paint residue on the board.

EXAMPLE 14

A concentrate was prepared substantially in accordance with the procedures described in Example 1, Step A. Approximately 3 hours after the concentrate was prepared, 50 percent by weight, based on the weight of the concentrate, of tap water was added with low shear blending. A much stronger exotherm was exuded upon the addition of water as compared to Examples 1 through 10 and the formulation turned purple in color.

When evaluated to determine the paint removing effectiveness in accordance with the procedures previously described on red base coat automotive paint, observable paint residue remained on the board.

EXAMPLE 15

In both A and B below, the amount of tripropylene glycol monomethyl ether was adjusted to accommodate the greater and lesser amount of cellulose thickener.

A

A water-based formulation was prepared substantially according to the procedures described in Example 1, except that about 0.66 percent by weight of thickener was used in preparing the concentrate.

About 96 hours after the formulation was prepared, separation into layers was obServed. The formulation returned to a homogenous mixture when hand-shaken.

B

A water-based formulation was prepared substantially according to the procedures described in Example 1, except that about 0.88 percent by weight of thickener was used in preparing the concentrate.

About 96 hours after the formulation was prepared, separation into layers was observed. The formulation returned to a homogenous mixture when hand-shaken.

Both of these formulations were evaluated for their stripping effectiveness after re-homogenization in accordance with the procedures previously described on red base coat automotive paint. No observable paint residue or formulation remained on the board in either case.

EXAMPLE 16

A

A formulation was prepared substantially according to the procedures described in Example 1, except that 0.25 percent by weight based on the total weight of the formulation of a nonionic octylphenoxypoly (ethyleneoxy) ethanol liquid surfactant, (Igepal ® CA-210 available from GAF Chemicals Corp.) in admixture with the tripropylene glycol monomethyl ether, was added. A substantially homogenous mixture could not be obtained.

B

A formulation was prepared substantially according to the procedures described in Example 1, except that 0.25 percent by weight, based on the total weight of the formulation, of a nonionic nonylphenoxypolyethoxyethanol liquid surfactant (Poly-Tergent ® B-300 commercially available from Olin Corporation), in admixture with the tripropylene glycol monomethyl ether was added. A substantially homogenous mixture could not be obtained.

Both formulations 16A and 16B were evaluated for their paint-stripping effectiveness on red base coat automotive paint. Observable paint residue and formulation remained on the panels in each case.

EXAMPLE 17

A coating remover concentrate is prepared by heating about 25.18 parts by weight, based on the total weight of the concentrate, of NMP to 150° F. About 0.5 percent by weight of a polyacrylic acid thickening agent (Carbopol ® 934 resin) was added and vigorously mixed until the resin was completely dissolved. About 1.25 percent by weight of di-2(ethylhexyl) amine was added and the mixture allowed to cool to room temperature.

To this mixture, about 46.56 percent by weight of Aromatic 100 was added with low shear mixing and then about 25.47 percent by weight of tripropylene glycol monomethyl ether was added with continued mixing. Finally, about 1.04 percent by weight of monoethanolamine was added with continued mixing.

To this concentrate, an equal part of tap water was added with low-shear mixing until a substantially homogenous mixture was afforded.

This formulation was evaluated for its effectiveness according to the procedures described above on red base coat automotive paint. Observable coating residue and formulation remained on the panel.

EXAMPLE 18

A formulation was prepared substantially according to the procedures described in Example 1, except that an alkali-soluble acrylic polymer emulsion (Acrysol TM ICS-1 thickener commercially available from Rohm and Haas Company) was used as the thickening agent. This formulation was evaluated for its paint-stripping effectiveness on red base coat automotive paint in accordance with the procedures described above. Observable coating residue, and formulation remained on the panel.

EXAMPLE 19

A formulation was prepared substantially according to the procedures described in Example 1, except that ethyl cellulose (Ethocel ® commercially available from The Dow Chemical Company) was used rather than hydroxypropyl methylcellulose as a thickener. This formulation was evaluated for its paint-stripping effectiveness on red base coat automotive paint in accordance with the procedures described above. Observable coating residue and formulation remained on the panel.

EXAMPLE 20

A formulation was prepared substantially according to the procedures described in Example 1 except that a polyacrylic thickener (Texigel ® commercially available from Scott Bader & Co., Ltd.) was used. This formulation was evaluated for its paint-stripping effectiveness on red base coat automotive paint in accordance with the procedures described above. Observable coating residue remained on the panel.

EXAMPLE 21

A formulation was prepared substantially according to the procedures described in Example 1 except that the thickener was added to warm tap water and then heated to a boil. When all of the thickener was dissolved, the temperature was rapidly lowered to room temperature and combined with the other constituents under low shear mixing. A homogenous mixture could not be obtained.

EXAMPLE 22

A paint-stripping formulation was prepared according to U.S. Pat. No. 4,120,810 including a glycol ether, hydroxypropylcellulose thickener and both of the surfactants in the amounts described in Example 16A and 16B. To this formulation was added an equal part of water with mixing under low shear. A substantially homogenous mixture could not be obtained.

The paint-stripping effectiveness of this formulation on red base coat automotive paint was evaluated according to the procedures described above. Observable coating residue and formulation remained on the panel.

It should be appreciated that Examples 13, 14 and 16 through 22 are outside the scope of the present invention and are presented for purposes of comparison. Each of these Examples are not at least one of substantially homogenous, and/or stable and/or effective. Further, several of these formulations could not be rinsed well with water. Rinsability is, of course, an important characteristic for automobile assembly plant paint booth applications.

EXAMPLE 23

A water-based coating remover formulation is prepared substantially following the procedures of Example 1 except that blending of the constituents was carried out under high-shear conditions. The blending speed was such that a deep vortex cavity is observed. Within about 72 hours, the formulation separated into visually observable distinct layers. The formulation could not be returned to a homogenous state after gentle and then vigorous shaking by hand.

It was quite surprising and unexpected that the shear conditions under which these formulations are prepared would have such a significant effect on the stability of the resulting formulations.

EXAMPLE 24

A formulation was prepared substantially according to the procedures described in Example 1. This formulation was used in the following evaluations.

A

The formulation was applied with a paint brush to an uncoated (i.e. bare) piece of white pine molding, and allowed to sit for 15 minutes. The formulation was wiped off with a damp cloth and the wood examined. No observable raising of the grain was detected.

B

The formulation was applied with a paint brush to an uncoated (i.e. bare) piece of oak handrail and allowed to sit for 30 minutes. The formulation was removed with a damp cloth and the wood examined. No observable raising of the grain was detected.

C

The formulation was applied to the finished side of a piece of fir veneer plywood with a paint brush and allowed to sit for 30 minutes. The formulation was wiped off with a damp cloth and the wood examined. No observable raising of the grain was detected.

D

A new broom having a painted handle was obtained and about six inches of the handle dipped into an aliquot of the formulation and then removed. The formulation was allowed to sit for 30 minutes and then wiped off with a damp cloth. The existing paint was removed down to bare wood suitable for re-finishing and no observable raising of the grain was detected.

EXAMPLE 25

A formulation was prepared substantially according to the procedures described in Example 1, except that 0.9 percent by weight, based on the total weight of the formulation, of a nonionicnonylphenoxypolyethoxyethanol liquid surfactant (Poly-Tergent ® B-300 commercially available from Olin Corporation), was added with low shear blending after the addition of tap water. A substantially homogenous mixture was obtained in contrast to Example 16B.

This formulation was evaluated for its paint-stripping effectiveness according to the procedures described above on red base coat automotive paint. The test panel rinsed clean with water and no observable coating residue or formulation could be detected on the panel.

It should be understood that the present specification and claims are set forth by way of illustration and not limitation and that various modifications and changes may be made without departing from the spirit and scope of the present invention as defined by the appended claims.

We claim:

1. A substantially stable homogenous water-based coating remover composition comprising:
   (a) from about 7.2 to about 19.6 percent by weight of N-methyl-2-pyrrolidone; and
   (b) from about 12.15 to about 47.6 percent by weight of at least one mononuclear aromatic hydrocarbon; and
   (c) from about 7 to about 15 percent by weight of a glycol ether selected from tripropylene glycol mono ($C_1$–$C_4$) alkyl ether and diethylene glycol monobutyl ether; and
   (d) from about 0.225 to about 2.8 percent by weight of an alkanolamine; and
   (e) from about 0.297 to about 0.616 percent by weight of a hydroxypropyl cellulose thickener; and
   (f) from about 30 to about 55 percent by weight water.

2. A composition according to claim 1 including from about 0.72 to about 1.4 percent by weight of an ethoxylated alkyl phenol.

3. A composition according to claim 2 wherein said ethoxylated alkyl phenol is present at from about 0.8 to about 1.0 percent by weight.

4. A composition according to claim 2, wherein said N-methyl-2-pyrrolidone is present at from about 7.52 to about 16.8 percent by weight.

5. A composition according to claim 2, wherein said mononuclear aromatic hydrocarbon is present at from about 12.69 to about 40.8 percent by weight.

6. A composition according to claim 2, wherein said glycol ether is tripropylene glycol mono($C_1$–$C_4$)alkyl ether.

7. A composition according to claim 6, wherein said glycol ether is tripropylene glycol monomethyl ether.

8. A composition according to claim 2, wherein said glycol ether is present at from about 6.58 to about 18.0 percent by weight.

9. A composition according to claim 2, wherein said alkanolamine is monoethanolamine.

10. A composition according to claim 2, wherein said alkanolamine is present at from about 0.235 to about 2.4 percent by weight.

11. A composition according to claim 2, wherein said hydroxypropyl cellulose thickener is hydroxypropyl methylcellulose.

12. A composition according to claim 11, wherein said hydroxypropyl methyl cellulose is present at from about 0.31 to about 0.528 percent by weight.

13. A composition according to claim 2, wherein said water is present at from about 40 to about 53 percent by weight.

14. A process for preparing a water-based coating remover composition comprising:
  (a) dissolving a hydroxypropyl cellulose thickener in a mixture of N-methyl-2-pyrrolidone and mononuclear aromatic hydrocarbon and blending under low shear conditions; and
  (b) adding a glycol ether selected from tripropylene glycol mono($C_1$-$C_4$)alkyl ether and diethylene glycol monobutyl ether to the intermediate product of (a) with continued mixing; and
  (c) adding an alkanolamine to the intermediate product of (b) with continued mixing; or
  (d) adding an admixture of said glycol ether and alkanolamine to the intermediate product of (a) with continued mixing; and
  (e) adding water to the intermediate product of (c) or (d) with continued mixing.

15. A process according to claim 14 further comprising adding an ethoxylated alkyl phenol to the product of (e) with continued mixing.

16. A process for preparing a water-based coating remover composition comprising:
  (a) dissolving a hydroxypropyl cellulose thickener in N-methyl-2-pyrrolidone at a temperature of from about 70° C. to about 120° C. with mixing under low shear conditions; and
  (b) adding a mononuclear aromatic hydrocarbon to the intermediate product of (a) with continued mixing; and
  (c) adding a glycol ether selected from tripropylene glycol mono($C_1$-$C_4$) alkyl ether and diethylene glycol monobutyl ether to the intermediate product of (b) with continued mixing; and
  (d) adding an alkanolamine to the intermediate product of (c) with continued mixing; or
  (e) adding an admixture of said glycol ether and alkanolamine to the intermediate product of (b) with continued mixing; and
  (f) adding water to the intermediate product of (d) or (e) with continued mixing.

17. A process according to claim 16 wherein said N-methyl-2-pyrrolidone is at a temperature of from about 90° C. to about 110° C.

18. A process according to claim 16 further comprising adding an ethoxylated alkyl phenol to the product of (f) with continued mixing.

* * * * *